(12) United States Patent
Sato (10) Patent No.: US 6,366,735 B1
(45) Date of Patent: Apr. 2, 2002

(54) BLUR PREVENTING SYSTEM OF CAMERA

(75) Inventor: Tatsuya Sato, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/540,278

(22) Filed: Mar. 31, 2000

(30) Foreign Application Priority Data

Apr. 14, 1999 (JP) .......................................... 11-106582

(51) Int. Cl.⁷ .............................................. G03B 17/00
(52) U.S. Cl. ........................................ 396/55; 396/263
(58) Field of Search ............................. 396/52–55, 263, 396/266, 264

(56) References Cited

U.S. PATENT DOCUMENTS

| | | | |
|---|---|---|---|
| 4,623,930 A | 11/1986 | Oshima et al. ............ 396/55 X |
| 5,099,694 A | 3/1992 | Sumio et al. ................. 73/654 |
| 5,589,912 A | * 12/1996 | Shiomi ......................... 396/55 |
| 5,608,703 A | * 3/1997 | Washisu ........................ 396/55 |
| 5,734,932 A | * 3/1998 | Washisu ........................ 396/55 |
| 5,953,544 A | * 9/1999 | Kai et al. ...................... 396/55 |

* cited by examiner

Primary Examiner—W. B. Perkey
(74) Attorney, Agent, or Firm—Frishauf, Holtz, Goodman, Langer & Chick, P.C.

(57) ABSTRACT

A blur detecting section detects a blurred state of a camera body. A photographing condition determining section determines at least photographing conditions and a state of use of the camera body. A first blur preventing section performs a first blur preventing operation in accordance with a result of blur detection by the blur detecting section. A second blur preventing section performs a second blur preventing operation in accordance with a result of blur detection by the blur detecting section. A blur preventing control section selects one of the first and second blur preventing sections in accordance with a result of determination by the photographing conditions determining section. A blur preventing mode selecting section is connected to the blur preventing control section, and allows the blur preventing control section to switch control modes.

13 Claims, 6 Drawing Sheets

BLUR PREVENTING SYSTEM OF CAMERA

CROSS-REFERENCE TO RELATED APPLICATIONS

This application is based upon and claims the benefit of priority from the prior Japanese Patent Application No. 11-106582, filed Apr. 14, 1999, the entire contents of which are incorporated herein by reference.

BACKGROUND OF THE INVENTION

The present invention relates to a blur preventing system of a camera, and particularly to a blur preventing system applied to a camera having a blur preventing function.

Conventionally, an image-pickup apparatus, such as a camera, has a blur preventing function in order to prevent an influence of camera-shake on image movement during picture taking.

For example, U.S. Pat. Nos. 4,623,930 and 5,099,694 disclose a blur detecting technique, in which blur detecting, controlling and correcting means are incorporated in an interchangeable lens section, and a predetermined correcting operation is executed in accordance with a timing signal (first and second release signals 1R and 2R) supplied from the camera body, so that image movement due to the camera-shake can be prevented. Various techniques have been developed using such a blur detecting technique.

According to the above conventional art, since a blur correcting operation is performed in accordance with the camera operation timing, a certain power is consumed, while a blur preventing switch (SW) of the lens section is on.

Although, therefore, a blur preventing effect can be expected at any time, there may be a case where the blur preventing operation is unnecessary or the operator wishes to avoid such an operation so far as possible in order to minimize the power consumption and increase the number of pictures taken in a limited time, if the exposure time is clearly shorter than 1/f, for example.

For this purpose, it is only necessary to keep the blur preventing switch SW off in general. However, in this case, the blur preventing operation is not performed at all. Thus, there is fear of occurrence of image movement due to the camera-shake or the like.

BRIEF SUMMARY OF THE INVENTION

The present invention was made to overcome the above problem of the conventional art. Accordingly, an object of the present invention is to provide a blur preventing system for efficiently preventing blur, in which blur preventing modes can be switched to each other, depending on photographing conditions or a state of use of the camera, or the operator's intention.

To achieve the above object, according to a first aspect of the present invention, there is provided a blur preventing system of a camera comprising:

blur detecting means for detecting a blurred state of a camera body;

photographing condition determining means for determining photographing conditions and a state of use of the camera body;

first blur preventing means for performing a first blur preventing operation in accordance with a result of blur detection by the blur detecting means;

second blur preventing means for performing a second blur preventing operation in accordance with a result of blur detection by the blur detecting means; and blur preventing control means for selecting one of the first and second blur preventing means in accordance with a result of determination by the photographing conditions determining means.

According to another aspect of the present invention, there is provided a blur preventing system of a camera comprising:

a blur detecting section for detecting a blurred state of a camera body;

a photographing condition determining section for determining photographing conditions and a state of use of the camera body;

a first blur preventing section for performing a first blur preventing operation in accordance with a result of blur detection by the blur detecting section;

a second blur preventing section for performing a second blur preventing operation in accordance with a result of blur detection by the blur detecting section;

a blur preventing control section for selecting one of the first and second blur preventing sections in accordance with a result of determination by the photographing conditions determining section; and a blur preventing mode selecting section, connected to the blur preventing control section, to allow the blur preventing control section to switch control modes.

According to still another aspect of the present invention, there is provided a blur preventing system of a camera comprising:

a blur detecting section for detecting a blurred state of a camera body;

a photographing condition determining section for determining photographing conditions and a state of use of the camera body;

a first blur preventing section for performing a first blur preventing operation in accordance with a result of blur detection by the blur detecting section;

a second blur preventing section for performing a second blur preventing operation in accordance with a result of blur detection by the blur detecting section;

a blur preventing control section for selecting one of the first and second blur preventing sections in accordance with a result of determination by the photographing conditions determining section.

According to a further aspect of the present invention, there is provided a blur preventing method of a camera comprising the steps of:

detecting a blurred state of a camera body;

determining photographing conditions and a state of use of the camera body;

selecting one of a first and second blur preventing operations to be performed in accordance with a result of determination of the photographing conditions and the state of use;

performing the first blur preventing operation in accordance with a result of detection of blur of the camera body, if the first blur preventing operation is selected to be performed; and performing the second blur preventing operation in accordance with a result of detection of blur of the camera body, if the second blur preventing operation is selected to be performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to the accompanying drawings.

Figure 1:
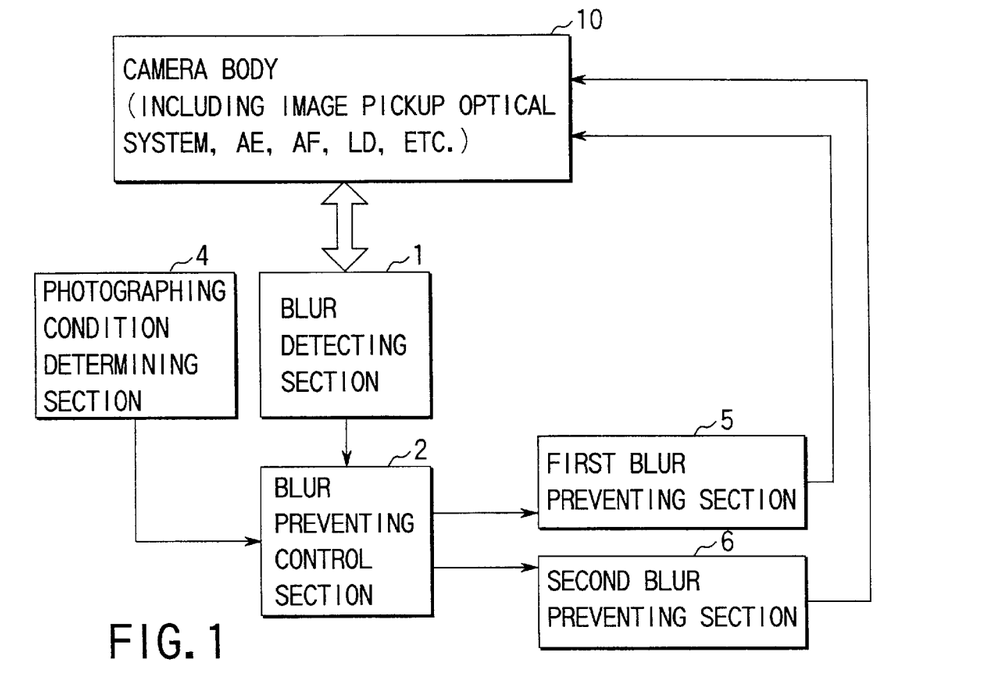
FIG. 1 is a block diagram showing a schematic structure of a blur preventing system of a camera according to an embodiment of the present invention.

FIG. 1 is a block diagram showing a schematic structure of a blur preventing system of a camera according to an embodiment of the present invention.

As shown in FIG. 1, outputs of both a photographing condition determining section 4 and a blur detecting section 1 are connected to an input of a blur preventing control section 2.

An output of the blur preventing control section 2 is connected to inputs of a first blur preventing section 5 and a second blur preventing section 6.

In the above structure, the photographing condition determining section 4 determines photographing conditions of the camera, such as an exposure time and an f-stop number, and outputs a determination result to the blur preventing control section 2.

Using the blur detecting technique disclosed in, for example, U.S. Pat. Nos. 4,623,930 and 5,099,694 mentioned above, the blur detecting section 1 detects blur conditions (e.g., a camera shake) of a camera body 10 including an image-pickup optical system, an automatic exposure control (AE) section, an automatic focus adjustment (AF) section, a lens driving (LD) section, etc. It outputs a detection result to the blur preventing control section 2.

The blur preventing control section 2 selects either the first blur preventing section 5 or the second blur preventing section 6 based on the determination result supplied from the photographing condition determining section 4.

The first blur preventing section 5 adopts a mode for changing an operating position of a part of the photographing optical system or the image-pickup section of the camera body 10 in order to correct movement of an image due to camera-shake.

The second blur preventing section 6 adopts a mode for changing start timing of an exposure operation in accordance with the state of camera-shake.

Figure 3:
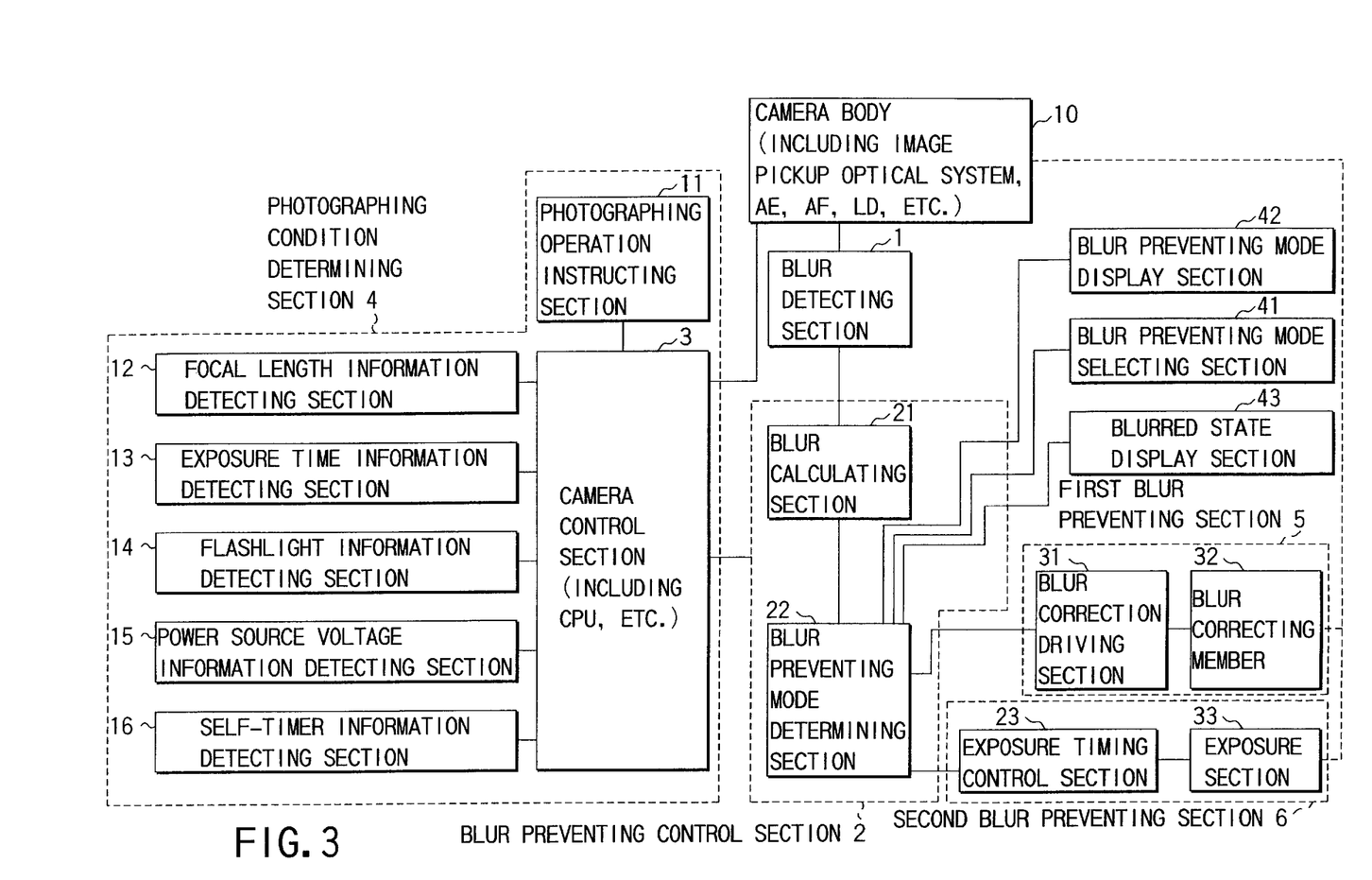
FIG. 3 is a block diagram showing details of the structure shown in FIG. 1.

FIG. 3 is a block diagram showing details of the structure shown in FIG. 1.

As shown in FIG. 3, the photographing condition determining section 4 comprises a photographing operation instructing section 11, a focal length information detecting section 12, an exposure time information detecting section 13, a flashlight information detecting section 14, a power source voltage information detecting section 15, a self-timer information detecting section 16 and a camera control section 3.

The above sections 11 to 16 and predetermined sections of the camera body 10, for example, the automatic exposure control (AE) section, the automatic focus adjustment (AF) section and the lens driving (LD) section, are electrically connected to the camera control section 3 including a CPU, etc.

The blur preventing control section 2 includes a blur calculating section 21 and a blur preventing mode determining section 22.

The first blur preventing section 5 includes a blur correction driving section 31 and a blur correcting member 32.

The second blur preventing section 6 includes an exposure timing control section 23 and an exposure section 33.

Besides, the blur preventing system of the camera according this embodiment, comprises a blur preventing mode selecting section 41, a blur preventing mode display section 42 and a blurred state display section 43.

In the structure described above, the photographing operation instructing section 11 corresponds to release switches of the camera body 10. When the release button is depressed half, a first release switch (1R) is turned on, and when completely depressed, a second release button (2R) is turned on.

The focal length information detecting section 12 detects a focal length and outputs a detection result to the camera control section 3.

The exposure time information detecting section 13 outputs information relating to an exposure time to the camera control section 3.

The flashlight information detecting section 14 outputs information on flashlight setting (emission/non-emission) to the camera control section 3.

The power source voltage information detecting section 15 detects a camera power source voltage and outputs the information thereon to the camera control section 3.

The self-timer information detecting section 16 detects whether a self-timer mode is set, and outputs a detection result to the camera control section 3.

The camera control section 3 outputs these information to the blur preventing control section 2 in the subsequent stage.

In the blur preventing control section 2, the blur calculating section 21 receives the blur information detected by the blur detecting section 1 and performs a predetermined calculation.

The result of the calculation is transmitted to the blur preventing mode determining section 22.

The blur preventing mode determining section 22 selects either the first blur preventing section 5 or the second blur preventing section 6 based on the information on the photographing conditions or the state of use of the camera supplied from the photographing condition determining section 4.

The result of the selection is displayed by the blur preventing mode display section 42.

More specifically, if the focal length is greater than a predetermined length (in the case of telephotography), the first blur preventing section 5 is selected. If smaller (in the case of wide-angle photography), the second blur preventing section 6 is selected.

If the exposure time is longer than a predetermined period (in the case of low speed), the first blur preventing section 5 is selected. If shorter (in the case of high speed), the second blur preventing section 6 is selected.

If flashlight is not emitted, the first blur preventing section 5 is selected. If flashlight is emitted, the second blur preventing section 6 is selected.

If the power source voltage of the camera is higher than a predetermined voltage (in the case of high voltage), the first blur preventing section 5 is selected. If lower (in the case of low voltage), the second blur preventing section 6 is selected.

In the case of a non-self-timer mode, the first blur preventing section 5 is selected. In the case of a self-timer mode, the second blur preventing section 6 is selected.

Actually, the blur preventing mode determining section 22 determines which of the blur preventing sections 5 and 6 is to be selected, taking all the above information into account.

If the first blur preventing section 5 is selected, the blur correction driving section 31 drives the blur correcting member 32 and an operating position of a part of the photographing optical system or the image-pickup section of the camera body 10 is changed. As a result, the blur is corrected.

In contrast, if the second blur preventing section 6 is selected, the exposure timing control section 23 sets a timing of start of an exposure operation. Based on the set start timing, the exposure section 33 performs an exposure operation.

Figure 2:
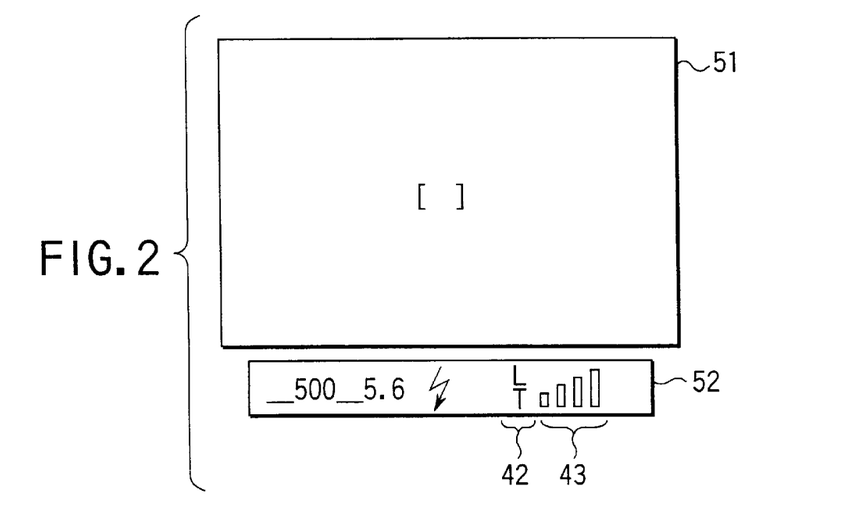
FIG. 2 is a diagram showing display states of a blur preventing mode display section and a blurred state display section used in the blur preventing system according to the embodiment.

FIG. 2 shows display states of the blur preventing mode display section 42 and the blurred state display section 43.

As shown in FIG. 2, the blur preventing mode display section 42 and the blurred state display section 43 are located in a display section 52 under a finder 51.

When the first blur preventing section 5 is selected, the blur preventing mode display section 42 displays "L (Lens Drive)", which indicates that blur correction is performed by driving the lens.

When the second blur preventing section 6 is selected, it displays "T (Timing)", which indicates that exposure timing control is performed.

The blurred state display section 43 displays a predetermined mark, as shown in FIG. 2, which is varied in accordance with the magnitude of blur.

As described above, according to the blur preventing system of this embodiment, the blur preventing modes can be switched in accordance with photographing conditions or a state of use of the camera, or the operator's intention. Therefore, blur can be prevented efficiently.

More specifically, as described above, the blur preventing system of this embodiment automatically determines the blur preventing section to be selected by the camera, in accordance with photographing conditions or a state of use of the camera. It prevents blur by the blur correcting operation or the exposure timing control. In addition, it displays a blur preventing mode in accordance with the determined blur preventing section.

An operation of the blur preventing system of a camera of this embodiment will be described with reference to the flowchart of FIG. 4.

When a power switch (not shown) is turned on, and power on reset is executed, the CPU included in the camera control section 3 initializes variables and the like (step S1).

Then, the CPU stands by until the first release switch (1R) is turned on. When the switch (1R) is turned on (step S2), the CPU causes the automatic exposure control (AE) section, the automatic focus adjustment (AF) section, the lens driving (LD) section of the camera body 10 to respectively perform automatic exposure control (AE), automatic focus adjustment (AF) and lens driving (LD) (step S3).

Subsequently, the CPU executes a sub-routine "Photographing Condition Determination" to be described in detail later. In this sub-routine, the blur preventing mode determining section 22 determines whether the first or second blur preventing section 5 or 6 should be selected (step S4).

The CPU causes the blur preventing mode display section 42 to display the mode selected by the blur preventing mode determining section 22 (step S5).

Thereafter, the CPU causes the first or second blur preventing section 5 or 6 selected by the blur preventing mode determining section 22 to execute an actual blur preventing operation (step S6).

Then, if a change of the blur preventing mode is instructed (step S7), the CPU changes the contents of display of the blur preventing mode display section 42 to those of the mode after change (step S8). Thereafter, it switches the blur preventing mode (step S9).

Then, the CPU executes the changed blur preventing operation (step S10).

If a change of the blur preventing mode is not instructed, the blur preventing operation is executed again without changing the blur preventing mode (step S10).

Then, the CPU stands by until the second release switch (2R) is turned on. When the switch (2R) is turned on (step S11), the sub-routine "Exposure" (to be described in detail later) is executed to perform a predetermined exposure operation (step S12). Thereafter, the film is advanced a frame (step S13), and the procedure returns to the step S2.

If the second release switch (2R) is not turned on, and if the first release switch (1R) is off, the CPU determines that the photographing operation is stopped. Then, the display of the blur preventing mode display section 42 is turned off (step S15), the blur preventing operation is stopped (step S16), and the procedure returns to the step S2.

If the first release switch (1R) is still on, the CPU returns the procedure to the step S7 and the above operation is repeated.

The sub-routine "Photographing Condition Determination" executed in the step S4 shown in FIG. 4 will be described with reference to the flowchart of FIG. 5.

First, the CPU initializes the flags A and B for the blur preventing mode determining section 22 (step S21). If the exposure time detected by the exposure time information detecting section 13 is shorter than a predetermined period of time, the flag A is incremented by one (step S23). On the other hand, if the detected exposure time is equal to or longer than the predetermined period of time, the flag B is incremented by one (step S24).

Subsequently, the CPU determines whether the focal length of the camera detected by the focal length information detecting section 12 is shorter than a predetermined length (step S25). If the focal length is equal to or shorter than the predetermined length, the flag A is incremented by one (step S26). If the focal length is longer than the predetermined length, the flag B is incremented by one (step S27).

Then, the CPU determines whether there is information of flashlight emission detected by the flashlight information detecting section 14 (step S28). If flashlight emission is set, the flag A is incremented by one (step S29). If flashlight non-emission is set, the flag B is incremented by one (step S30).

Thereafter, the CPU determines whether the camera power source voltage detected by the power source voltage information detecting section 15 is lower than a predetermined voltage (step S31). If it is determined that the camera power source voltage is equal to or lower than the predetermined voltage, the flag A is incremented by one (step S32). If it is determined that the camera power source voltage is higher than the predetermined voltage, the flag B is incremented by one (step S33).

Then, the CPU determines whether there is information of self-timer photography is detected by the self-timer information detecting section 16 (step S34). If the self-timer photography mode is set, the flag A is incremented by one (step S35). If the self-timer photography mode is not set, the flag B is incremented by one (step S36).

The CPU compares the values of the flags A and B for the blur preventing mode determining section 22 (step S37). If the value of the flag A is smaller, the CPU causes the blur preventing mode determining section 22 to select the first blur preventing section 5 (step S38). If the value of the flag B is smaller, the CPU causes the blur preventing mode determining section 22 to select the second blur preventing section 6 (step S39). Then, the procedure returns to the main sequence of FIG. 4.

The sub-routine "Exposure" executed in the step S12 shown in FIG. 4 will be described with reference to the flowchart of FIG. 6.

In this sequence, the CPU first determines whether the first blur preventing section 5 is selected (step S41).

If the first blur preventing section 5 is selected, the CPU executes the sub-routine "First Blur Preventing Operation" (described in detail later), so that a predetermined blur correcting operation can be performed (step S42).

On the other hand, if the first blur preventing section 5 is not selected, the CPU causes the blur detecting section 1 to execute blur detection (step S43). Thereafter, it causes the blur calculating section 21 to execute blurred state determination (step S44) and compare the blur with a predetermined value (step S45).

If the blur is not smaller than the predetermined value, the CPU determines whether the shutter waiting time exceeds a predetermined period (step S46). If it does not exceed the predetermined period, the procedure returns to the step S43.

After the step S42, S45 or S46, the CPU advances to step S47 in any of the following case: after the sub-routine "First Blur Preventing Mode Operation" is executed, if the blur is determined to be smaller than the predetermined value, and if the shutter waiting time is determined to be longer than the predetermined period.

In the step S47, the CPU causes the shutter in the image-pickup optical system of the camera body 10 to open, and starts an exposure operation.

If the first blur preventing mode is selected (step S48), the CPU executes the sub-routine "First Blur Preventing Mode Operation" again (step S49). Thereafter, the CPU determines whether a calculated correct exposure time has elapsed or not (step S50).

If the calculated correct exposure time has elapsed, the CPU causes the shutter to close (step S51) to complete the exposure operation. Then, the CPU stops the blur preventing operation (step S52) and returns to the main sequence.

Figure 4:
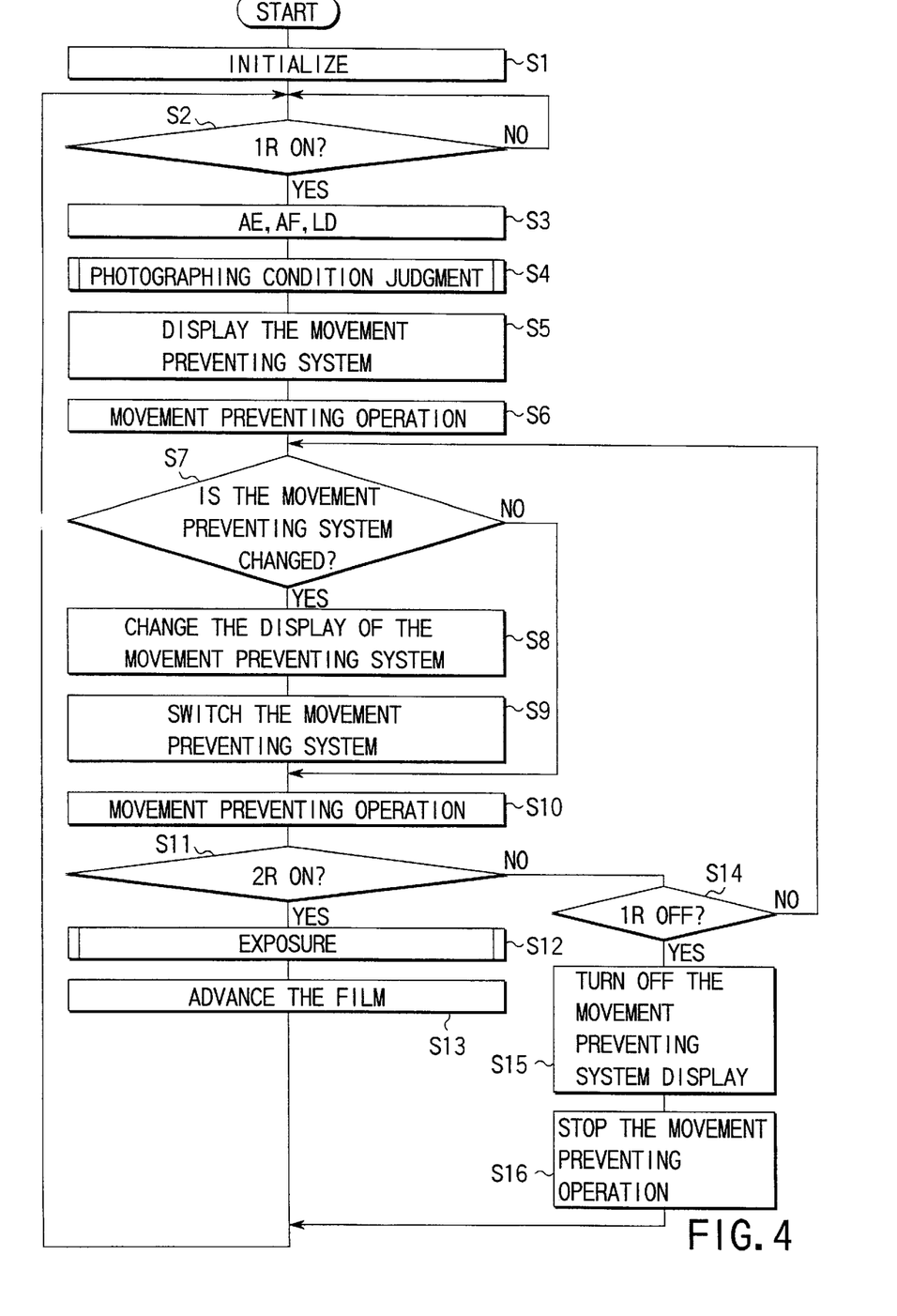
FIG. 4 is a flowchart for explaining in detail an operation of the blur preventing system of the embodiment.
Figure 5:
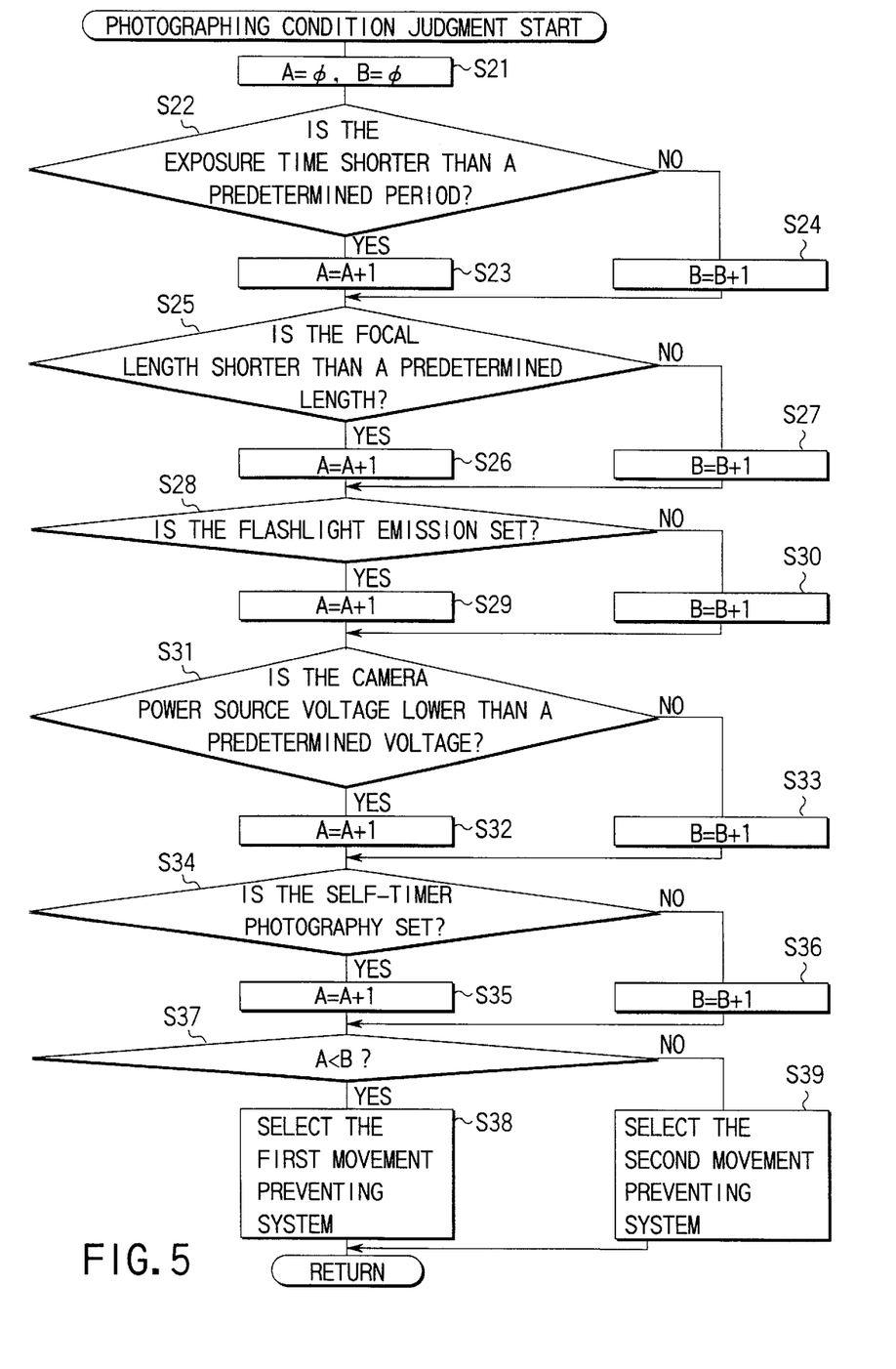
FIG. 5 is a flowchart for explaining an operation of the sub-routine "Photographing Condition Determination" executed in the step S4 shown in FIG. 4.
Figure 7:
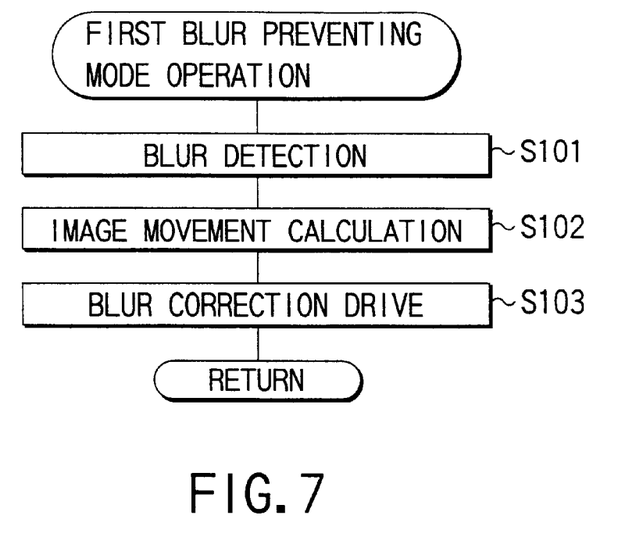
FIG. 7 is a flowchart for explaining an operation of the sub-routine "First Blur Preventing Mode Operation"
Figure 8:
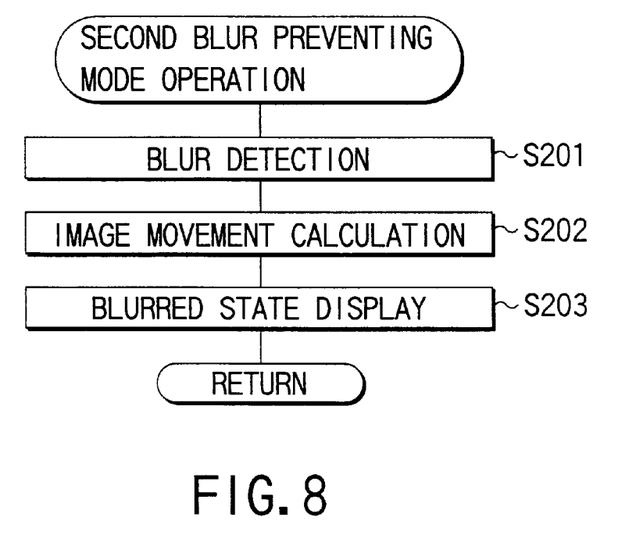
FIG. 8 is a flowchart for explaining an operation of the sub-routine "Second Blur Preventing Mode Operation".

The blur preventing operation of the steps S6 and S10 shown in FIG. 4 are executed by executing the subroutine "First Blur Preventing Mode operation" shown in FIG. 7 or the sub-routine "Second Blur Preventing Mode Operation" shown in FIG. 8.

As shown in FIG. 7, in the sub-routine "First Blur Preventing Mode Operation", first of all, the blur detecting section 1 detects blur (step S101). Thereafter, the blur calculating section 21 performs a predetermined image movement calculation (step S102). Then, the first blur preventing section 5 executes blur correction drive by driving the blur correcting member 32 by means of the blur correction driving section 31 in the first blur preventing section 5 (step S103).

Figure 6:
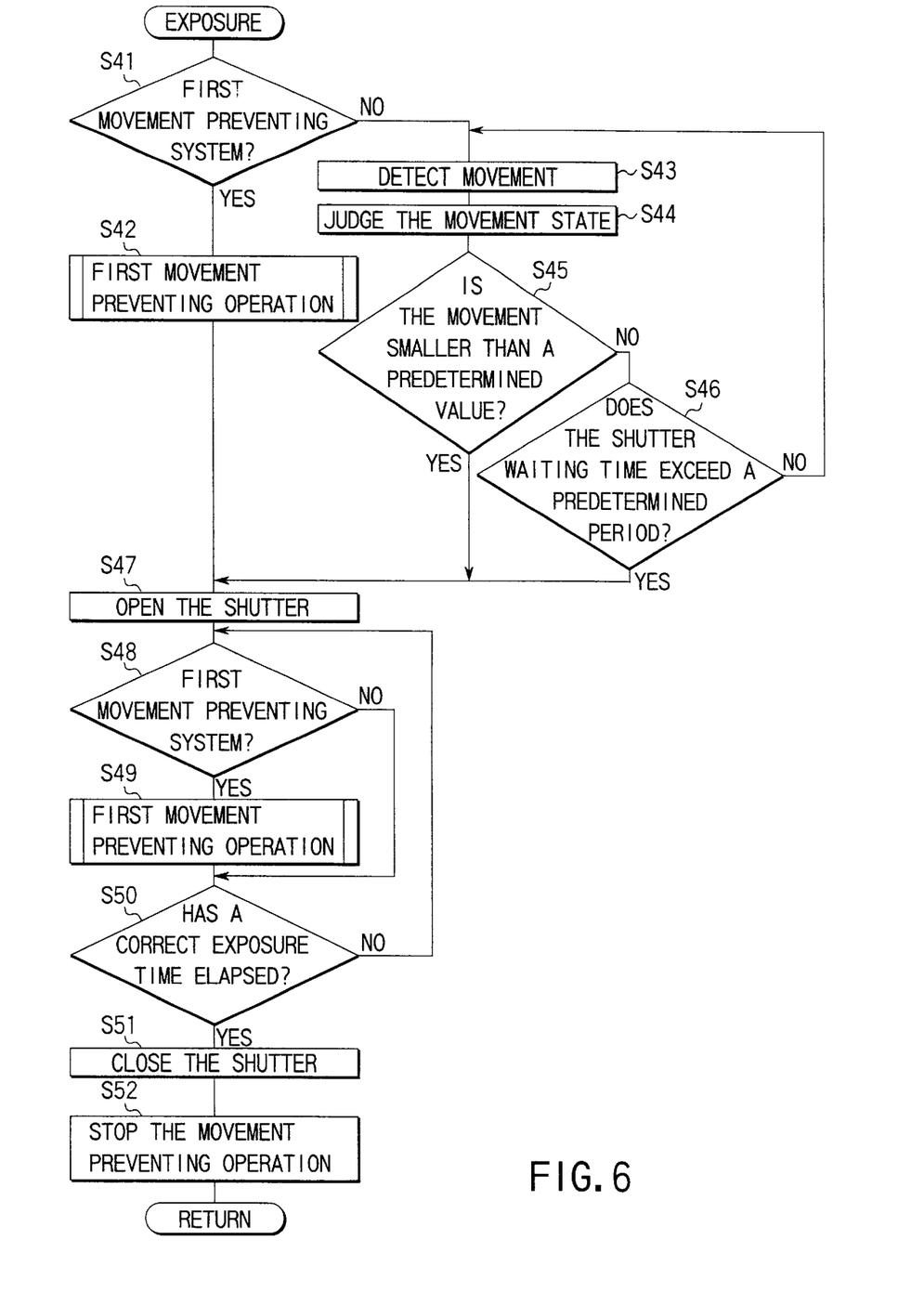
FIG. 6 is a flowchart for explaining an operation of the sub-routine "Exposure" executed in the step S12 shown in FIG. 4.

The sub-routine "First Blur Preventing Mode Operation" is also executed in the steps S42 and S49 shown in FIG. 6.

In the sub-routine "Second Blur Preventing Mode Operation", as shown in FIG. 8, first the blur detecting section 1 detects blur (step S201). Thereafter, the blur calculating section 21 performs a predetermined image movement calculation (step S202). Then, the blurred state display section 43 displays a blurred state in the manner as shown in FIG. 2. (step S203)

As described above, in the blur preventing system of a camera according to the embodiment of the present invention, the blur preventing modes (the blur correcting mode/the exposure start timing control mode) can be switched in accordance with the photographing conditions of the camera or a state of use (the focal length, the exposure time or the power source voltage of the camera). Therefore, an efficient blur preventing operation can be performed.

Further, since the information of the blur preventing mode determined by the blur preventing system of the camera is notified (displayed) to the user, the user can recognize beforehand which blur preventing mode is to be executed.

If the user wishes to adopt the blur preventing mode other than that determined by the blur preventing system of the camera, the mode can be changed. Therefore, an efficient and user-friendly blur preventing operation can be performed.

The present invention is not limited to the embodiment described above.

For example, in the sub-routine "Photographing Condition Determination", a blur preventing mode is selected in consideration of all the information concerning the exposure time, the focal length, whether the flashlight is emitted, the camera power source voltage, and whether the self-timer photography mode is set. However, it is possible to assign weights to some of the information or select a mode based on some of the information.

As has been described above, according to the present invention, it is possible to provide a blur preventing system for efficiently preventing blur, in which the blur preventing mode is switched depending on photographing conditions or a state of use of the camera, or the operator's intention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A blur preventing system of a camera comprising:
   blur detecting means for detecting a blurred state of a camera body;
   photographing condition determining means for determining photographing conditions and a state of use of the camera body;
   first blur preventing mode operating means for correcting a blur, in accordance with a result of blur detection by the blur detecting means, by displacing a photographing optical system during a photographing exposure operation so as to reduce blurring of an image being photographed;
   second blur preventing mode operating means for correcting the blur, in accordance with the result of blur detection by the blur detecting means, by changing a timing to start the photographing exposure operation until an amount of blurring is decreased to be equal to or below a predetermined value so as to reduce blurring of the image being photographed; and
   blur preventing mode determining means for determining which one of the first and second blur preventing mode operating means is to be driven, in accordance with a result of determination by the photographing conditions determining means.

2. A blur preventing system of a camera according to claim 1, further comprising a blur preventing method display means for displaying which one of the first and second blur preventing mode operating means has been selected by the blur preventing control means.

3. A blur preventing system of a camera according to claim 2, further comprising a blurred state display section for executing a display having a size which corresponds to a size of a blurred state of the camera body detected by the blur detecting means.

4. a blur preventing system of a camera according to claim 1, wherein:
   the photographing condition determining means includes a focal length information detecting section for detecting focal length information of the photographing optical system; and
   the blur preventing mode determining means selects the first blur preventing mode operating means if the focal length information detected by the focal length information detecting section is equal to or greater than a predetermined value, and the second blur preventing mode operating means if the focal length information is smaller than the predetermined value.

5. A blur preventing system of a camera according to claim 1, wherein:
   the photographing condition determining means includes an exposure time information detecting section for detecting exposure time information of the camera; and
   the blur preventing mode determining means selects the first blur preventing mode operating means if the exposure time information detected by the exposure time information detecting section is equal to or greater than a predetermined period of time, and the second blur preventing mode operating means if the exposure time information is smaller than the predetermined period of time.

6. A blur preventing system of a camera according to claim 1, wherein:
   the photographing condition determining means includes a flashlight information detecting section for detecting flashlight information; and
   the blur preventing mode determining means selects the first blur preventing means if the flashlight information detected by the flashlight information detecting section is equal to or greater than a predetermined value, and the second blur preventing means if the flashlight information is smaller than the predetermined value.

7. A blur preventing system of a camera according to claim 1, wherein:
   the photographing condition determining means includes a power source voltage information detecting section for detecting power source voltage information of the camera body; and
   the blur preventing mode determining means selects the first blur preventing mode operating means if the power source voltage information detected by the power source voltage information detecting section is equal to or greater than a predetermined value, and the second blur preventing mode operating means if the power source voltage information is smaller than the predetermined value.

8. A blur preventing system of a camera according to claim 1, wherein:
   the photographing condition determining means includes a self-timer information detecting section for detecting self-timer information indicating whether or not a self-timer photography mode has been set; and
   the blur preventing mode determining means selects the first blur preventing mode operating means if the self-timer information detected by the self-timer information detecting section indicates that the self-timer photography mode has not been set, and the second blur preventing means if the self-timer information indicates that the self-timer photography mode has been set.

9. A blur preventing system of a camera according to claim 1, wherein:
   the photographing condition determining means includes a focal length information detecting section for detecting focal length information of the photographing optical system, an exposure time information detecting section for detecting exposure time information of the photographing optical system, a flashlight information detecting section for detecting flashlight information, a power source voltage information detecting section for detecting power source voltage information of the camera body, and a self-timer information detecting section for detecting self-timer information indicating whether or not a self-timer photography mode has been set; and
   the blur preventing mode operating means selects one of the first and second blur preventing mode operating means based on at least one of the focal length information detected by the focal length information detecting section, the exposure time information detected by the exposure time information detecting section, the flashlight information detected by the flashlight information detecting section, the power source voltage information of the camera body detected by the power source voltage information detecting section, and the self-timer information detected by the self-timer information detecting section.

10. A blur preventing system of a camera comprising:

a blur detecting section for detecting a blurred state of a camera body;

a photographing condition determining section for determining photographic conditions and a state of use of the camera body;

a first blur preventing mode operating section for correcting a blur, in accordance with a result of blur detection by the blur detecting section, by displacing a photographing optical system during a photographing exposure operation so as to reduce blurring of an image being photographed;

a second blur preventing mode operating section for correcting the blur, in accordance with the result of blur detection by the blur detecting section, by changing a timing to start the photographing exposure operation until an amount of blurring is decreased to be equal to or below a predetermined value so as to reduce blurring of the image being photographed;

a blur preventing mode determining section for automatically selecting and setting which one of the first and second blur preventing mode operating sections is to be driven, in accordance with a result of determination by the photographing conditions determining section; and a blur method operation setting section for arbitrarily enabling driving of a selected one of the first blur preventing mode operating means and the second blur preventing mode operating means.

11. A blur preventing system of a camera according to clam 10, further comprising a blur preventing mode display section for displaying which one of the first and second blur preventing mode operating means has been selected by the blur preventing mode determining means.

12. A blur preventing system of a camera according to claim 10, wherein:

the photographing condition determining section includes at least one of a focal length information detecting section for detecting focal length information of the photographing optical system, an exposure time information detecting section for detecting exposure time information of the camera, a flashlight information section for detecting flashlight information, a power source voltage information detecting section for detecting power source voltage information of the camera body, and a self-timer information detecting section for detecting self-timer information indicating whether or not a self-timer photography mode has been set; and the blur preventing mode determining section selects one of the first and second blur preventing mode operating sections based on at least one of the focal length information detected by the focal length information detecting section, the exposure time information detected by the exposure time information detecting section, the flashlight information detected by the flashlight information detecting section, the power source voltage information detected by the power source voltage information detecting section, and the self-timer information detected by the self-timer information detecting section.

13. A method of preventing blur in a camera comprising:

detecting a blurred state of a camera body;

determining photographic conditions and a state of use of the camera body;

correcting a blur by a first blur preventing mode operation, in accordance with a result of blur detection, by displacing a photographing optical system during a photographing exposure operation so as to reduce blurring of an image being photographed; and correcting the blur by a second blur preventing mode operation, in accordance with the result of blur detection, by changing a timing to start the photographing exposure operation until an amount of blurring is decreased to be equal to or below a predetermined value; and automatically selecting and setting which one of the first blur preventing mode operation and the second blur preventing mode operation is to be driven, in accordance with the determined photographic conditions and the result of blur detection.

* * * * *